Sept. 8, 1959     O. C. EARHART     2,903,311
TRAY
Filed Feb. 8, 1956
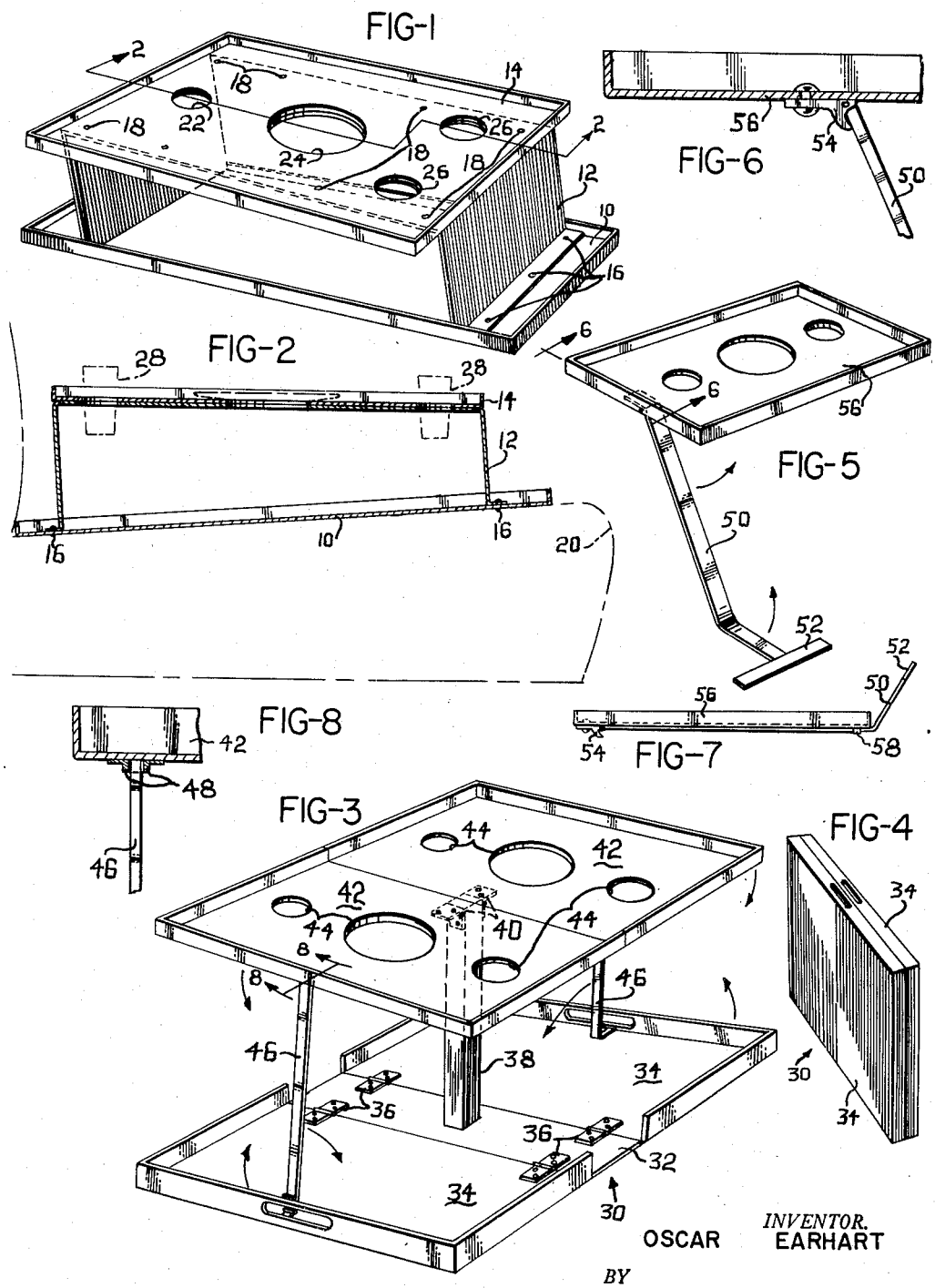
INVENTOR.
OSCAR EARHART
BY
ATTORNEYS

United States Patent Office 2,903,311
Patented Sept. 8, 1959

2,903,311

TRAY

Oscar C. Earhart, Troy, Ohio

Application February 8, 1956, Serial No. 564,177

2 Claims. (Cl. 311—22)

This invention relates to a tray, and particularly to a trap adapted for resting on an automobile seat for supporting containers of foodstuffs, including paper cups and the like.

In handling articles of food in drive-in restaurants, it is customary for the restaurant to deliver the food ordered on a simple tray which will attach to the door of the car adjacent the driver and from which tray the food is served to the individuals within the car. An arrangement of this sort is generally satisfactory where there are only two people in the car, but it often occurs that there are rear seat occupants, which may be children which complicates the handling of the food, particularly where cups of liquid are involved.

Having the foregoing in mind, it is a particular object of the present invention to provide a tray arrangement especially adapted for resting on an automobile seat and adapted for receiving and supporting containers of food, including cups of liquid.

Another object of this invention is the provision of a tray arrangement of the nature referred to which can be collapsed and thus carried in the car to be available for use whenever desired.

A still further object is the provision of a tray of the nature referred to which is inexpensive to manufacture and which can thus be provided at low cost.

A still further objective of this invention is the provision of a tray arrangement of the nature referred to which also serves as a crumb and waste tray thereby keeping the interior of a car relatively neat and clean.

These and other objects will become apparent by referring to the drawings in which:

Figure 1 is a perspective view of a preferred form which a tray according to my invention can take.

Figure 2 is a vertical longitudinal section through the tray of Figure 1 as indicated by line 2—2 on Figure 1.

Figure 3 is a modified type of tray adapted for being collapsed for carrying and storage.

Figure 4 is a perspective view showing the tray of Figure 3 as it appears when collapsed.

Figure 5 is a perspective view of still another form which the tray can take characterized in that the tray has a supporting leg adapted for being inserted between the seat and back cushions of an automobile seat.

Figure 6 is a sectional view indicated by line 6—6 on Figure 5 showing a pivotal connection between the leg of the tray and the tray proper.

Figure 7 is a view of the Figure 5 arrangement showing the leg collapsed for either stacking or carrying.

Figure 8 is a fragmentary sectional view indicated by line 8—8 on Figure 3 showing a socket type connection between the tray platform and a supporting leg of the tray.

Referring more in detail to the drawings, the arrangement shown in Figure 1 comprises a lower tray or platform portion 10 having attached thereto the inverted U-shaped support member 12 which carries on its upper surface a tray-like platform 14. Rivets 16 secure support member 12 to base platform 10 and rivets 18 may be provided for securing the upper platform 14 to the support member 12.

According to the present invention, the tray-like platform 14 and the base platform 10 are arranged so as to converge toward one side so that when the tray is disposed on an automobile seat cushion as at 20 in Figure 2 the upper tray portion is substantially horizontal.

The arrangement described is availed of for supporting trays of food by virtue of the substantial area of tray 14, and may also be availed of for supporting cups of different sizes by means of apertures indicated at 22, 24 and 26. These apertures extend through both tray 14 and the upper part of support portion 12 and are of such a size that they will receive and support cups, such as paper cups as indicated at 28 in Figure 2.

The described arrangement is sufficiently wide to support articles of the size of fairly large baskets such as are used for fried chicken and French fried potatoes, while still being narrow enough to be rested on the ordinary automobile seat between two persons. This not only makes the handling of the food much more convenient, but it also reduces the chances of spilling any liquid that may be served in cups and making it quite simple to feed small children.

The arrangement shown in Figure 3 is of a somewhat different type and is slightly larger than the Figures 1 and 2 modifications, and is adapted for supporting more articles than can be supported by the Figures 1 and 2 arrangement, while still being small enough to set on the seat of the average automobile between two people.

In Figure 3 there is a base portion 30 consisting of a central panel 32 and wings 34 hinged to the center panel as by hinges 36. A central support 38 is upstanding from the central panel 32 and at its upper end is connected thereto by hinges 40 the two sections 42 of the upper platform which, as in the case of the first tray modification has a plurality of apertures 44 therein for receiving liquid containers and a substantial area of flat surface in addition thereto.

Braces 46 are provided which are pivotally connected with the side portions 34 of the base and which are adapted for being raised upwardly to be received in the pockets 48 secured to the underneath side edges of the parts of the upper platform.

The arrangement is such that the braces 46 can be hinged downwardly thereby permitting the portions 42 to drop downwardly whereupon the side portions 34 of the base can be raised upwardly and the entire device will then be collapsed as indicated in Figure 4 and it can then be stored underneath the front seat, for example, of the ordinary automobile.

A somewhat simpler modification is illustrated in Figures 5 and 6 wherein there is provided a leg member 50 having at its lower end a substantially horizontally extending portion 52 adapted for being received between the rear and seat cushions of a vehical seat so as to hold the leg member 50 in upright position. At its upper end leg member 50 connects by means of a pivot bracket 54 with an apertured platform tray 56. This tray is adapted for being collapsed downwardly against leg member 50 as illustrated in Figure 7 to be retained in that position by a clip 58 for storing of the platform for shipping thereof.

The support 54 provides for a predetermined position of the tray-like platform 56 on leg member 50 and is located beyond the center of the tray so that the tray will not tilt about its connection with the leg member in normal usage.

The arrangement described above is convenient and inexpensive and can be sold as a device to be carried in an automobile or can be utilized as a piece of equipment in a drive-in restaurant or the like. A preferable material from which to make the device if it is to be of permanent nature would be aluminum on account of the lightness thereof, but it is also conceivable that the device can be a throw-away item, in which case it would be formed of heavy paper or cardboard.

It will be understood that this invention is susceptible to modification in order to adapt it to different usages and conditions, and accordingly, it is desired to comprehend such modifications within this invention as may fall within the scope of the appended claims.

I claim:

1. In a car tray of the nature referred to; a base portion adapted for resting on a car seat, a tray portion located above the base portion end at an angle thereto so that when the base portion is supported on a car seat the tray portion will be substantially horizontal, a center post connecting said portions together, said tray portion being formed of two sections hinged to the upper end of the post so as to be foldable downwardly, and said base portion being formed of two sections hinged to the bottom end of the post so as to be foldable upwardly to enclose the folded down tray portion whereby the unit can be collapsed for storage.

2. In a car tray of the nature referred to; a base portion adapted for resting on a car seat, a tray portion located above the base portion end at an angle thereto so that when the base portion is supported on a car seat the tray portion will be substantially horizontal, a central post connecting said portions together, said tray portion being formed of two sections hinged to the upper end of the post so as to be foldable downwardly, and said base portion being formed of two sections hinged to the bottom end of the post so as to be foldable upwardly to enclose the folded down tray portion whereby the unit can be collapsed for storage, there being brace means pivotally carried by the opposite ends of said base portion adapted when the base and tray are opened for being moved into supporting engagement with the underneath side edges of said tray portion.

References Cited in the file of this patent

UNITED STATES PATENTS

| | | |
|---|---|---|
| 2,658,560 | Cawthon | Nov. 10, 1953 |
| 2,723,037 | Matesic | Nov. 8, 1955 |
| 2,808,191 | Cramer | Oct. 1, 1957 |